United States Patent [19]

Kristinsson et al.

[11] Patent Number: 5,234,116
[45] Date of Patent: Aug. 10, 1993

[54] TRUNK SECUREMENT MEANS FOR GROCERY BAGS AND PACKAGES

[76] Inventors: Bjarni Kristinsson, 1417 N. Vista St. #303, Los Angeles, Calif. 90046; Philip H. White, 22 Cottontail Trail, Upper Saddle River, N.J. 07458

[21] Appl. No.: 898,427

[22] Filed: Jun. 15, 1992

[51] Int. Cl.$^5$ .............................................. A47F 7/00
[52] U.S. Cl. ...................................... 211/201; 248/99
[58] Field of Search ....................... 211/200, 201, 202; 248/277, 100, 99

[56] References Cited

U.S. PATENT DOCUMENTS

| | | |
|---|---|---|
| D. 222,367 | 10/1971 | Goss . |
| D. 264,651 | 6/1982 | Adamson . |
| D. 264,653 | 6/1982 | Adamson . |
| D. 264,905 | 6/1982 | Adamson . |
| D. 273,159 | 4/1984 | Adamson et al. . |
| D. 278,497 | 4/1985 | Walpin . |
| D. 280,871 | 10/1985 | Provan . |
| D. 285,885 | 9/1986 | Cusenza et al. . |
| 784,035 | 3/1905 | Connard ............... 211/202 X |
| 995,120 | 6/1911 | Cooper ................. 211/201 X |
| 1,627,559 | 5/1927 | Haul ..................... 211/202 X |
| 2,568,996 | 9/1951 | Evans ................... 211/202 X |
| 4,175,604 | 11/1979 | Cavalaris et al. . |
| 4,189,056 | 2/1980 | Majewski . |
| 4,285,163 | 8/1981 | Booker, Jr. . |
| 4,364,534 | 12/1982 | Valesko . |
| 4,372,512 | 2/1983 | Wolfe . |
| 4,467,987 | 8/1984 | Stroh . |
| 4,540,213 | 9/1985 | Herlitz et al. . |
| 4,549,748 | 10/1985 | Haley, Sr. .............. 248/99 X |
| 4,623,111 | 11/1986 | Prader . |
| 4,684,087 | 8/1987 | Speckard . |
| 4,690,357 | 9/1987 | Webster . |
| 4,723,743 | 2/1988 | Jenkins . |
| 4,746,041 | 5/1988 | Cook et al. . |
| 4,805,857 | 2/1989 | Travis . |
| 5,131,499 | 7/1992 | Hoar ..................... 248/100 X |
| 5,131,547 | 7/1992 | Goldberg ............... 211/201 X |

Primary Examiner—Ramon O. Ramirez
Assistant Examiner—Sarah A. Lechok
Attorney, Agent, or Firm—Cislo & Thomas

[57] ABSTRACT

A readily transportable rack or assembly for holding packages or bags in a stable condition, comprising a collapsible and expandable framework for providing spaced, side-by-side compartments, accessible from overhead to place packages or bags therein. The collapsible and expandable frame can be extended linearly providing for compartments of greater size or collapsed linearly for providing compartments of lesser size. Collapsible and expandable frames are adjustably positionable, depending upon a particularly chosen size to correspond to packages or bags to be held. In addition, hooks on a top end of the frames can be utilized for purposes of holding handles of grocery bags to prevent the bags from toppling over. Ideally, the rack is utilized in vehicles to prevent the packages or bags from rolling around in the vehicle during its movement.

23 Claims, 2 Drawing Sheets

TRUNK SECUREMENT MEANS FOR GROCERY BAGS AND PACKAGES

BACKGROUND OF THE INVENTION

This invention relates generally to trunk securement of bags and packages, particularly a rack which is expandable and collapsible for purposes of holding a variety of different types of packages and grocery bags.

There a large number of different types of racks for holding packages, boxes, and bags. They vary in complexity, ease of manufacturability, and effectiveness. A preliminary patentability search uncovered a number of different types of package or bag holding devices.

The preliminary patentability search conducted at the U.S. Patent and Trademark Office was directed to a field of search encompassing classes 211/71, 85, 89, 94.5, 104, 105, 181, 195; D3/40, 70; D6/566, 411, 458, 461, 487, 552, 571; D9/341; D8/71, 370, 373; and D34/5, 6, 40, 42, 45, 46. The patents listed below were uncovered by the search.

| PATENT NO. | NAME OF INVENTOR | DATE ISSUED |
| --- | --- | --- |
| 4,175,604 | M. T. Cavalaris, et al. | November 27, 1979 |
| 4,189,056 | E. J. Majewski | February 19, 1980 |
| 4,285,163 | W. G. Booker, Jr. | August 25, 1981 |
| 4,364,534 | T. M. Valesko | December 21, 1982 |
| 4,372,512 | W. R. Wolfe | February 8, 1983 |
| 4,467,987 | A. L. Stroh | August 28, 1984 |
| 4,540,213 | J. E. Herlitz, et al. | September 10, 1985 |
| 4,623,111 | R .D. Prader | November 18, 1986 |
| 4,684,087 | G. V. Spickard | August 4, 1987 |
| 4,690,357 | J. N. Webster | September 1, 1987 |
| 4,723,743 | J. C. Jenkins | February 9, 1988 |
| 4,746,041 | L. R. Cook, et al. | May 24, 1988 |
| 4,805,857 | E. E. Travis | February 21, 1989 |
| Des. 222,367 | R. C. Goss | October 19, 1971 |
| Des. 264,651 | G. Adamson | June 1, 1982 |
| Des. 264,653 | G. Adamson | June 1, 1982 |
| Des. 264,905 | G. Adamson | June 15, 1982 |
| Des. 273,159 | G. Adamson, et al. | March 27, 1984 |
| Des. 278,497 | A. Walpin | April 23, 1985 |
| Des. 280,871 | A. R. Provan | October 8, 1985 |
| Des. 285,885 | A. P. Cusenza, et al. | September 30, 1986 |

Brief descriptions of the more pertinent of the patents covered by the search are given below.

U.S. Pat. No. 4,175,602—Calalaris et al.

This patent is directed to several embodiments of a plastic bag holder. In its simplest form, the plastic bag holder comprises two Z-shaped sides 10, 12 with a connector bar 14 connecting the inturned rear lower portions 27 and 28. The upper forward portions have hook 46 for hooking the handles of a plastic bag. Though intended for filling plastic bags, this holder could be used to keep bags from falling over in the rear of a car trunk or otherwise.

U.S. Pat. No. 4,189,056—Majewski

This patent is directed to a portable rack, sized to fit in a car trunk and having several partition forming compartments for minimizing the movement of articles placed therein while being transported in a vehicle between point of purchase and point of utilization. The storage rack 10 having base 14, back 15, and side 16, hinged side 17, and two partitions 18 forms compartments suitable for holding bags or packages, but no provisions are made for hooking plastic bags. This reference shows a collapsible feature of FIG. 7, however, there is no showing of the "X" frame configuration.

U.S. Pat. No. 4,540,213—Herlitz et al.

This patent is directed to a cargo organizer for items such as grocery bags in the back of a station wagon. The organizer comprise a plurality of skid slats 40 with hinges 46 and cross rail 52 with support members 54 to hold the rack in an upright position.

U.S. Pat. No. 4,623,111—Pader

This patent is directed to several embodiments of a wire holder for plastic bags with handles. FIG. 4 has wire members along all twelve edges of a rectangular parallelipiped that allow for folding flat. The holder, though intended for holding bags open for filling, would be useful for other uses like transportation.

Des. 285, 885—Cusenza et al.

This patent is directed to a wire rack for the support of grocery bags. The rack has two adjustable dividers and can be folded flat for storage. No provisions are made to hook the handles of plastic bags.

There is much interest in a package and bag retaining device which can be easily transported, easily stored, easily manufactured and effective in retaining a variety of different packages and bags in the trunk of an automobile or truck. The device should ideally prevent the packages or bags from rolling around during the vehicle's movement during use, and then collapsed for storage or transport. There is a potential interest in the package holding industry to manufacture and market such a device which provides for all of these features.

The features identified above as being desirable for a package-holding device are all provided by the present invention.

SUMMARY OF THE INVENTION

The present invention is embodied in an improved collapsible and expandable rack for holding packages and bags of various sizes. The rack comprises at least a first frame having a generally rectangular configuration and generally lying in a first plane, and having a top and a bottom. A second standing frame, having a generally rectangular configuration and generally lying in a second plane, generally parallel to the first plane, has a top and bottom and is interconnected with the first frame. A first cross member, having a first and second end, is attachable between the frames, yet, can freely rotate at its point of attachment. A plurality of these types of cross members can be utilized between the frames, so that the frames can stand in a side-by-side relationship and circumscribe therebetween a space of variable area for purposes of receiving packages and bags. Because of the rotational movement of the cross members relative to the frames, the frames may move away from each other or toward each other to provide for the predetermined area between them, yet still remain standing erect.

A securing means is associated with at least one of the cross-members, which is attachable at the point where the cross-member attaches one of the frames for selectively preventing the cross-member from rotating relative to the frame attached thereto. This effectively locks the frames together with a pre-determined space between them, depending upon the packages or bags to be retained therebetween.

Also, the cross-members may be pinned together so as to rotate about their respective mid-sections between the frames to be held, and provide for a more sturdy structure.

Handles can be associated with regard to mid-sections of both frames so that a person expanding or collapsing the frames can easily grasp the handles associated with the mid-sections of the frames, and either extend the frames away from each other or collapse the frames toward each other. Also, a mesh may be associated with respect to each of the frames for preventing the packages or bags from falling through one side or the other of the frames.

Also, extending legs may be associated with each of the frames for purposes of providing greater stability of the rack when positioned within the trunk of the automobile. Furthermore, rubber feet located on undersurfaces of the frames can provide for greater frictional engagement between the floor of the trunk and the rack, itself.

Retaining means or hooks are attachable to the top of the frame for purposes of hooking and retaining the handles of plastic bags, so that plastic bags can be retained and strung between the frames.

Furthermore, a plurality of these types of frames and cross-members can be serially associated to provide a plurality of bag or package retaining spaces of variable dimension. Attachment means on each of the frames allows the cross-members to not only rotate, but to move axially along the length of each of the frames so that the entire plurality of frames and cross-members can expand and collapse. The attachment means can utilize bolts or pins with enlarged ends attachable to the cross-members and the frames so that the cross-members and frames are attached, but free to rotate with respect to one another, where one end of each cross-member can move both laterally and axially to its associated frame.

Other aspects and advantages of the present invention will become apparent from the following description of the preferred embodiments, taken in conjunction with the accompanying drawings, which illustrate, by way of example, the principles of the invention.

DESCRIPTION OF THE PREFERRED EMBODIMENTS

Figure 1:
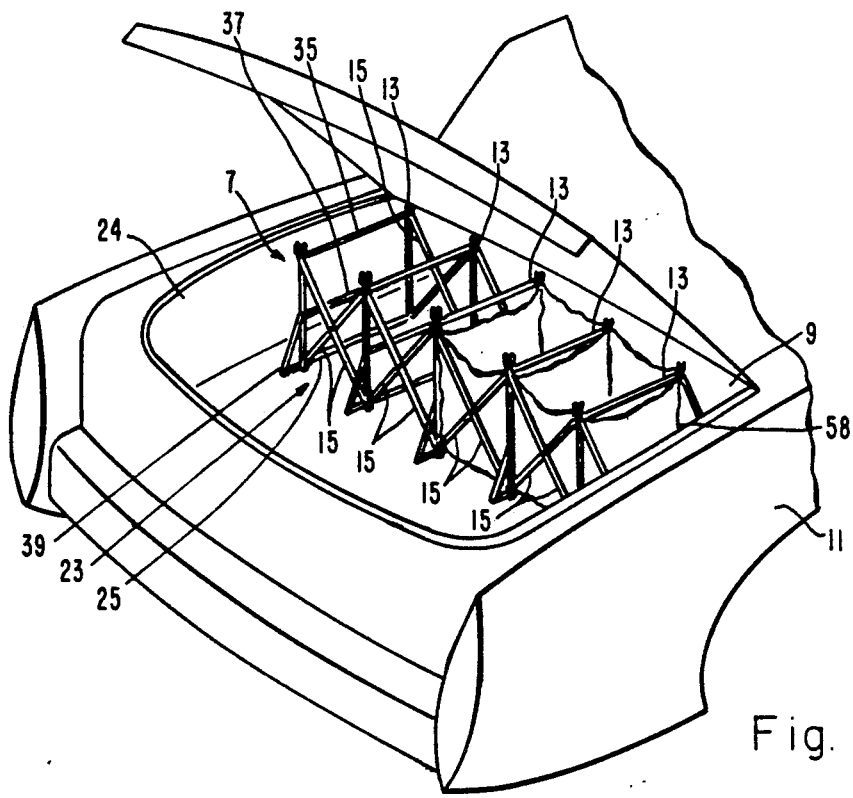
FIG. 1 is a top perspective view of a portion of an automobile with its trunk open, revealing therein the rack of the present invention retaining two grocery bags.
Figure 2:
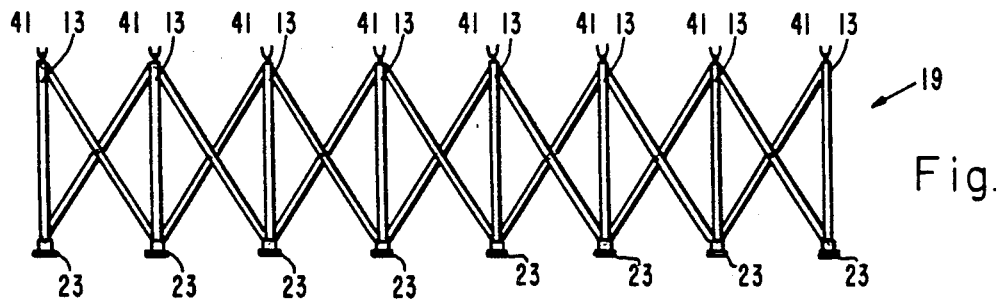
FIG. 2 is another embodiment of the present invention having the ability to define seven different compartments for holding packages or bags.
Figure 3:
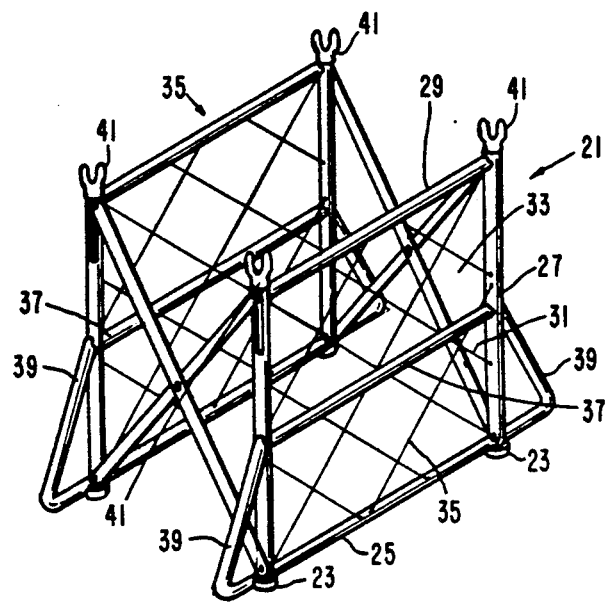
FIG. 3 is a top perspective view of another embodiment of the present invention defining a single compartment for retaining a package or a bag.

As shown in the drawings, the invention is embodied in a rack 7 and wherein like numerals represent like elements throughout FIGS. 1-4 The rack 7, shown in FIG. 1, is positioned within the trunk 9 of an automobile 11. The rack 7 comprises a plurality of parallel-standing frames 13 of generally rectangular configuration, and a plurality of criss-crossing cross-members 15, which retain the frames 13 in linear and serially side-by-side relationship.

While the embodiment of the invention, shown in FIG. 1 as numeral 7, can accommodate five different bags 17, the embodiment of the invention 19 can accommodate up to or more than seven different bags or define sufficient space for up to or more than seven different compartments for holding packages (not shown). Or, alternatively, a third embodiment, designated by the numeral 21, and shown in FIG. 3, may only define a singular area for a single package (not shown).

All the embodiments can utilize rubber or elastomeric feet 23, associated on an underside 25, of each frame 13, particularly beneath parallel vertical members 27 which define the frame 7, in conjunction with the parallel, horizontal members 29. The feet may have knurled surfaces for purposes of fictionally engaging a floor 24 of a trunk 9 of an automobile 11. The horizontal members 29 are generally parallel to each other, while perpendicular to the vertical members 27, which are generally parallel to each other. A mesh, cording, or string 31 may be interconnected between the horizontal members 29 and the vertical members 27 to prevent packages or bags (not shown) from passing through the limited plane defined by the area 33, circumscribed by the vertical members 27 and horizontal members 29. However, such mesh 31 may not be required if the racks 7, 19, or 21 are being used for purposes of holding certain types of grocery bags 17.

It should be also noted that on each end 35 of the racks 7, 19, and 21, an additional horizontal member 37 associated with the vertical members 27 can be utilized for purposes of acting as a handle allowing a person to easily grasp the rack 7, 19, or 21 and expand it by pulling apart the frames 13 or collapse the rack 7, 19, or 21 by pushing the frames toward each other.

Associated with the vertical members 27 of the frame 13 are stabilizing legs 39 having a generally right triangular configuration, and attached to the vertical members 27 by bolts, screws, welding, or other means in the art. The legs 39 can also be integrally formed with the frames 13. The extending legs 39 serve to prevent the rack 7, 19, or 21 from tipping over.

Figure 4:
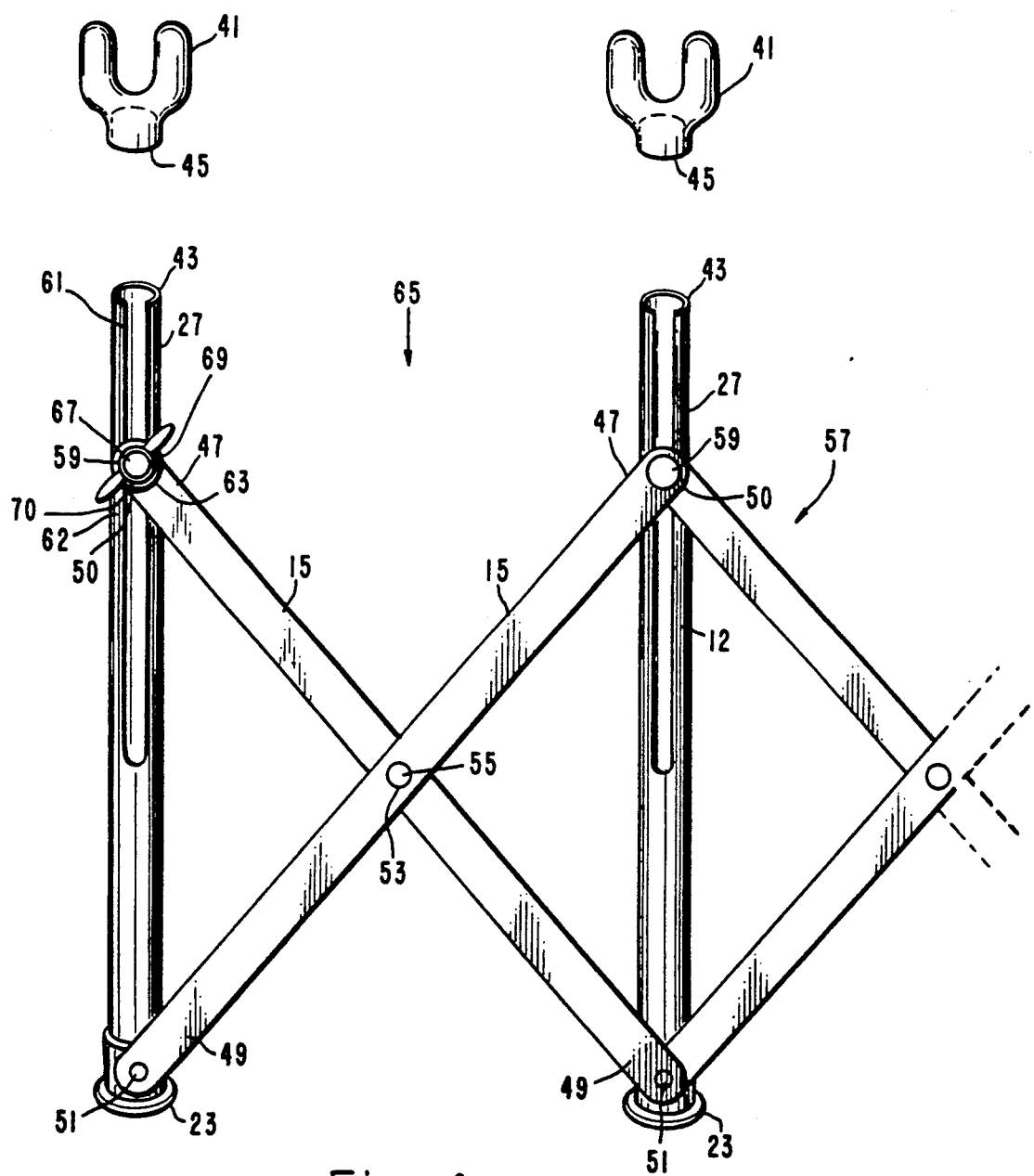
FIG. 4 is a fragmentary elevational view of a portion of the embodiments shown in FIGS. 1 and 2, more particularly showing the cross-member attachment and locking mechanism between the frames.

On top of each of the vertical members 27 are hooks 41, which are readily attachable to the tops 43 of the vertical members 27, which are most clearly shown in FIG. 4. The hooks 41 have a cylindrical hollow undersurface 45, sized and having a configuration so as to engageably attach to the tops 43 of the vertical members 27 and be held fictionally thereby. Ideally, the hooks 41 are an elastomeric or plastic material of a variety of different types which can be readily determinable by a person skilled in the art.

It should be pointed out that various features and accessories of applicant's invention need not necessarily be included in any embodiment of the invention for purposes of the effective utilization of the rack 7, 19, or 21. For example, the rack 19, shown in FIG. 2, does not have extending legs 39 for purposes of support. Such extending legs 39 may not be necessary where the horizontal members 29 of the frames 13 are sufficiently longer than the vertical members 27 on the frame, since the rack 7, 19, or 21 will have a much lower center of gravity relative to its height, and considered stable thereby. The applicant has not conducted any experiments as to what would be a preferred configuration for the frames 13, but it is believed that a generally rectangular configuration would work in a number of circumstances, and possibly even a square configuration would be also provide a suitable configuration for practicing the invention. However, it should be recognized that the invention could be practiced with automobile attachment straps, struts or screws (not shown) to secure the rack 7, 19, or 21 within the trunk 9 of the automobile 11.

As can be seen in FIG. 4, the cross-members 15 have a top end 47 and a bottom end 49. A transverse hole 50 is located at each of these ends 47 and 49 of the cross-members 15, which is generally perpendicular to the axis of symmetry through the cross-members 15. A pin, screw, or bolt 51 pins the bottom ends 49 of the cross-members 15 to their respective vertical member 27 to allow the vertical members to freely rotate relative to their points of attachment. Another transverse hole 53 is located at the mid-section of each vertical member 15. A pin, screw, rivet, or bolt 55 retains the cross-members 15 joined together at their mid-section in rotative attachment so that each of the cross-members 15 may rotate with respect to on another at that point of attachment.

As shown in FIG. 4, the vertical members 27, utilize hollow tubing material for the vertical members 27, ideally made of a polymeric material or alternatively extended aluminum or any other material known to persons ordinarily skilled in the art or racks and household articles.

The top ends 47 of the cross-members 15 are engaged by a screw, nut, bolt, rivet 59 to the vertical members 27 within an axially located slot 61 along an upper portion 62 of the vertical members 27. Screws, nuts, bolts, or rivets 59 allow the top ends 47 of the cross-members 15 to retain the cross-members 15 to the vertical members 27, yet also allow the cross-members 15 to rotatively move within the axial slots 61 of the vertical members 27.

A locking nut, bolt, or thumb turn 63 may be utilized so as to fictionally engage and squeeze the upper end 47 of the cross-member 15 to the vertical member 27 for purposes of locking the top portion 47 of the cross-member 15 at any desirable position along the length of the axial slot 61. This, in effect, allows a particular desirable position or distance between each of the frames 13 defining a variety of different compartmental spaces 65 between each of the frames 13. It should be noted that this thumb-turn 63 can be located on any one of the vertical members 27 and still serve its locking function. Also, it may be desirable to have more than one thumb-turn 63 associated as different vertical members 27. In more detailed aspects, the thumb-turn 63 is a simple bolt 67 having a threaded end 69, which is engageable by threads 70 within a winged nut 70.

As can be seen, the various components of the applicant's invention can be easily manufactured with a minimal number of parts. The cross-members 15 and frame 17 can be fabricated out of metal, formed out of plastic, or made out of wood. Any type of meshing or netting 31 can be utilized while rubber or plastic feet 23 or hooks 41 can be easily formed. The types of materials to be used are almost limitless.

In use, the user of the rack 7, 19, or 21, or any other embodiment or variation of the invention can easily keep the invention in a collapsed condition in the trunk 9 so as not to take up space, and so as to be easily transportable. Then, when there are a substantial number of groceries, bags, or packages to be transported in the back of an automobile or in any other type of vehicle, the rack 7, 19, or 21 can be extended to an infinite number of different possible configurations allowing for a variety of different spaces 65 between each of the frames 13. This variability and the ability to lock the rack 7, 19, or 21 into an infinite number of different possible configurations is ideally suited for the various types of packages one might have to transport in an automobile.

It should be appreciated from the foregoing description that the present invention provides an improved rack for retaining packages and bags in an automobile to prevent the packages and bags from rolling around in the back of the automobile. The rack also is easily transportable, easily storable; it can expand out to accommodate an infinite number of different possible configurations, and then easily and quickly locked into place to maintain that preferred configuration.

The rack can be conveniently assembled from a minimum number of parts that can be easily manufactured. The parts can be manufactured with relatively inexact precision, and all are configured to facilitate compact and efficient shipment of the similar parts, as well as to provide for its collapsible and expandable qualities. Also, once assembled, the user of the rack need not perform any complicated assembly tasks for purposes of adjusting the dimensions or position of the rack.

Although the present invention has been described in detail with reference only to the presently-preferred embodiments, it should be appreciated by those of ordinary skill in the art, that various modifications can be made without departing from the invention. Accordingly, the invention is limited only by the following claims.

I claim:

1. A collapsible horizontal rack for holding packages of various sizes comprising:
    a first frame having a polygonal configuration generally lying in a first vertical plane, and having a top and a bottom;
    a second frame having a polygonal configuration congruent to said first frame and generally lying in a second vertical plane, substantially parallel to said first frame, and having a top and bottom;
    a first cross-member having a first and second end, said first end rotatively attachable to said top of said first frame, said second end rotatively attachable to said bottom of said second frame;
    a second cross-member having a first and second end, said first end rotatively attachable to said bottom of said first frame, said second end rotatively attachable to said top of said second frame;
    wherein said cross-members support said first and second frames in a standing position, forming a horizontal support and wherein said frames can be collapsed toward each other a predetermined distance, and extended away from each other a predetermined distance, to allow a desired space between said first and second frames to receive and retain the packages between said frames, forming said horizontal support.

2. A collapsible rack as claimed in claim 1, comprising:
    a first securing means associated with said first cross-member and one of said frames for selectively preventing said first cross-member from rotating to said one of said frames, whereby said rack can be selectively locked in a predetermined position circumscribing a particular space between said frames.

3. A collapsible rack as claimed in claim 1, comprising:
   a second securing means associated with said second cross-member and one of said frames for selectively preventing said second cross-member from rotating relative to said one of said frames, whereby said rack can be selectively locked in a predetermined position circumscribing said particularly desired space between said frames.

4. A collapsible rack as claimed in claim 2, comprising:
   a second securing means associated with said second cross-member and other of said frames for selectively preventing said second cross-member from rotating relative to said other frame, whereby the combination of said cross-members and said securing means selectively provide a sturdy rack in a plurality of different desired configurations.

5. A collapsible rack as claimed in claim 1, further comprising a handle associated with said frames for pulling apart and pushing together said frames relative to each other.

6. A collapsible rack as claimed in claim 1, further comprising extending legs associated with said bottoms of said frames providing additional stability for said rack in a standing position.

7. A collapsible rack as claimed in claim 1, further comprising retaining means attachable to said tops of said frames for retaining bags, whereby the bags can be hooked over said retaining means and secured between said frames.

8. A collapsible rack as claimed in claim 1, further comprising webbing associated with each of said frames to prevent the packages from passing through an area defined by each of said frames, whereby the packages cannot fall laterally through said area, defined by said frames.

9. A collapsible rack as claimed in claim 1, comprising a plurality of first and second frames, first and second cross-members, and inter-connecting first and second cross-members, having first and second ends to interconnect said plurality of frames laterally in a side-by-side relationship, and operatively associated together, wherein said frames and said cross-members are serially associated to form an expandable and collapsible rack defining a plurality of desired spaces between said plurality of frames to receive and retain the packages between said frames in a linear side-by-side relationship.

10. A rack as claimed in claim 1, comprising a plurality of attachment means for attaching said cross-members to said frame members, each allowing said cross-members to linearly move a pre-determined distance along an axial length of said respective frames, thereby allowing said rack to easily collapse and expand while keeping said frames in an upright and standing position.

11. A collapsible rack as claimed in claim 10, wherein said attachment means comprises a slot axially located near said top of each of said frames, said one end of each or said cross-members, defining a hole therethrough perpendicularly located relative to said axial slot, and a fastener, wherein said fastener pins each of said cross-members to each of said frame, respectively, each being freely movable along a length of said axial slot, thereby allowing said rack to selectively expand and collapse while maintaining said frames in an upright and standing condition when said fastener moves through said axial slot when expanding or collapsing.

12. A rack as claimed in claim 10, comprising a first securing means associated with said attachment means to hold and engage said attachment means in a selectively-fixed condition and preventing any extending and collapsing between said frames.

13. A rack as claimed in claim 12, wherein said cross-members lie together in pairs in substantially the same plane, and each pair having mid-points securely coupled together with each other, and rotatable with respect to said frames.

14. A rack as claimed in claim 13, wherein said frames include mesh means for preventing packages of a predetermined size from passing through areas defined by said frames.

15. A readily transportable assembly for holding packages or bags in a stable horizontally disposed condition comprising:
   a collapsible and expandable means for providing spaced, vertically disposed, side-by-said compartments, each of said compartments being about equal in height and being accessible from overhead and placement of the packages and bags vertically therein, wherein said collapsible and expandable means can be extended linearly, providing for compartments of greater size and collapsed linearly, providing compartments of lesser size, whereby said collapsible and expandable means is adjustably positionable, depending upon the particular sizes of the packages and bags to be held in each of said side-by-side compartments which remain vertically oriented.

16. A readily transportable assembly as claimed in claim 15, comprising hooks located on top of said collapsible including a handle for grasping to collapse and expand said collapsible and expandable means.

17. A readily transportable assembly as claimed in claim 15, comprising extending legs associated with a bottom of said collapsible and expandable means, thereby maintaining said collapsible and expandable means in an upright position and preventing the assembly from toppling over.

18. A readily transportable assembly as claimed in claim 15, wherein said collapsible and expandable means comprising parallel, positionable, standing elements forming said compartments therebetween and each parallel to each other, and connected one to another serially by interconnecting, criss-crossing members, thereby allowing said assembly to retain the packages and bags thereby.

19. A readily transportable assembly as claimed in claim 18, further comprising a locking means to selectively lock the collapsible means in one of a plurality of desirable positions, thereby maintaining a desirable distance between said standing elements.

20. A readily transportable assembly as claimed in claim 19, wherein said standing member includes a mesh, and wherein said standing elements on either end of said assembly, including a handle for grasping to collapse and expand said collapsible and expandable means.

21. A collapsible rack for holding packages of various sizes comprising:
   a first frame having a generally rectangular configuration, generally lying in a first plane, and having a top and a bottom;

a second frame having a generally rectangular configuration and generally lying in a second plane, substantially parallel to said first plane, and having a top and a bottom;

a first cross-member having a first and second end, said first end rotatively attachable to said top of said first frame, said second end rotatively attachable to said bottom of said frame;

a second cross-member having a first and second end, said first end rotatively attachable to said bottom of said first frame, said second end rotatively attachable to said top of said second frame;

retaining means attachable to said tops of said frames for retaining bags, whereby the bags can be hooked over said retaining means and secured between said frames;

wherein said cross-members support said first and second frames in a standing position, and wherein said frames can be collapsed toward each other in a predetermined distance, and extended away from each other a predetermined distance, to allow a desired space between said first and second frames to receive and retain the packages between said frames.

22. A collapsible rack for holding packages of various sizes comprising:

a first frame having a generally rectangular configuration, generally lying in a first plane, and having a top and a bottom;

a second frame having a generally rectangular configuration and generally lying in a second plane, substantially parallel to said first plane, and having a top and a bottom;

a first cross-member having a first and second end, said first end rotatively attachable to said top of said first frame, said second end rotatively attachable to said bottom of said frame;

a second cross-member having a first and second end, said first end rotatively attachable to said bottom of said first frame, said second end rotatively attachable to said top of said second frame;

webbing associated with each of said frames to prevent the packages from passing through an area defined by each of said frames, whereby the packages cannot fall laterally through said area, defined by said frames;

wherein said cross-members support said first and second frames in a standing position, and wherein said frames can be collapsed toward each other a predetermined distance, and extended away from each other a predetermined distance, to allow a desired space between said first and second frames to receive and retain the packages between said frames.

23. A readily transportable assembly for holding packages or bags in a stable condition comprising:

a collapsible and expandable means for providing spaced side-by-side compartments accessible from overhead and placement of packages and bags therein, said collapsible and expandable means having hooks located on top thereof for holding bags having handles, whereby the handles of the bags can be hooked over said hooks, while the bags are held within said compartments, wherein said collapsible and expandable means can be extended linearly, providing for compartments of greater size and collapsed linearly, providing compartments of lesser size, whereby said collapsible and expandable means is adjustably positionable, depending upon particular sizes of the packages and bags to be held.

* * * * *